United States Patent [19]
Stuart

[11] Patent Number: 5,386,953
[45] Date of Patent: Feb. 7, 1995

[54] SPACECRAFT DESIGNS FOR SATELLITE COMMUNICATION SYSTEM

[75] Inventor: James R. Stuart, Louisville, Colo.

[73] Assignee: Calling Communications Corporation, West Covina, Calif.

[21] Appl. No.: 931,625

[22] Filed: Aug. 18, 1992

Related U.S. Application Data

[63] Continuation-in-part of Ser. No. 790,748, Nov. 8, 1991, abandoned.

[51] Int. Cl.$^6$ ............................................. B64G 1/00
[52] U.S. Cl. .............................. 244/158 R; 244/159; 244/173
[58] Field of Search ................... 244/158 R, 159, 160, 244/161, 162, 167, 168, 173

[56] References Cited

U.S. PATENT DOCUMENTS

| | | | |
|---|---|---|---|
| 3,412,955 | 11/1968 | Vilbig | 244/158 R |
| 4,854,526 | 8/1989 | Rochefort | 244/158 R |
| 5,052,640 | 10/1991 | Chang | 244/173 |
| 5,199,672 | 4/1993 | Kaig et al. | 244/158 R |

FOREIGN PATENT DOCUMENTS

| | | |
|---|---|---|
| 1591114 | 4/1990 | France . |
| 1188822 | 7/1967 | United Kingdom . |

OTHER PUBLICATIONS

"Iridium is in the Works," B. R. Bertiger et al., *Aerospace America*, No. 2, 29 Feb. 1991, pp. 40–42.
European Patent Application No. 92300781.9, 30 Jan. 1992.
PCT International Patent Application No. PCT/US88/02365, 1 Jul. 1988.
Proceedings of the 1st Annual USU Conference on Small Satellites, Utah State University, 7–9 Oct. 1987.
Proceedings of the 2nd Annual AIAA/USU Conference on Small Satellites, Utah State University, 18–21 Sep. 1988.
Proceedings of the 3rd Annual AIAA/USU Conference on Small Satellites, Utah State University, 26–28 Sep. 1989.
Proceedings of the 4th Annual AIAA/USU Conference on Small Satellites, vol. 1, Utah State University, 27–30 Aug. 1990.

(List continued on next page.)

*Primary Examiner*—David M. Mitchell
*Assistant Examiner*—Christopher P. Ellis
*Attorney, Agent, or Firm*—Anglin & Giaccherini

[57] ABSTRACT

A series of spacecraft designs (10, 26 & 34) for a Satellite Communication System is disclosed. One of the preferred embodiments of the invention called "Domesat" (10) includes a hemispherical, high-gain, electronically-steered antenna array (12) that is always pointed toward the Earth (E). Hexagonal antenna panels (14) are held together by tubular and spherical connectors (22 & 24). The upper portion of the satellite (10) incorporates a space-facing array (16) of panels (18) which are always pointed toward the zenith (Z). The interior of the dome-shaped antenna array (12) is used to store solar cell panels (20) which unfurl through an opening (11) in the space-facing array (16) when the spacecraft (10) reaches its final orbit. An alternative embodiment of the invention called "Gearsat" (26) comprises a hollow torus which inflates when it reaches orbit. When viewed from the side along its circumference, "Gearsat" (26) looks like two flattened pyramids sharing a common base. Phased array antenna panels (29) are deployed across the top of the pyramid along an exterior cylindrical surface (28), while twin arrays of solar cells (30) cover the slanted surfaces. The satellite (26) rotates about its center, and individual antenna panels (29) are spatially synchronized to transmit and receive signals from particular regions on the ground. A third alternative embodiment called "Batsat" (34), includes a central cylindrical body (B) and a plurality of substantially circular linked antenna and solar/thermal panels (A1–A9 and S1 & S2) which carry individual antennas (X) and solar/-thermal surfaces (Y). All of the embodiments (10, 26 & 34) are capable of being nested or stacked in a compact arrangement that fit within the payload bay of a launch vehicle (L).

4 Claims, 11 Drawing Sheets

OTHER PUBLICATIONS

Proceedings of the 4th Annual AIAA/USU Conference on Small Satellites, vol. 2, Utah State University, 27–30 Aug. 1990.

Proceedings of the 5th Annual AIAA/USU Conference on Small Satellites, Utah State University, 26–29 Aug. 1991.

Proceedings of the 6th Annual AIAA/USU Conference on Small Satellites, Utah State University, 21–24 Sep. 1992.

Communications and Propagation Experiments Using the Olympus Spacecraft, SATCOM Report #202, Oct. 1991.

Workshop on Avd Netwk & Technology Concepts for Mobile, Micro, & . . . , JPL, JPL Publication 91–35, 15 Sep. 1991.

"Development of Unconventional Types of Spacecraft Suggested in OTA Report," Satellite Week, vol. 12, No. 10, 5 Mar. 90, pp. 4–5.

"Affordable Spacecraft," Office of Technology Assessment, OTA–BP–ISC–60, Jan. 1990.

Small Low–Cost Space Systems, Ball Aerospace Systems Group, 19 May 1988.

"Aries: Global Communication Through A Constellation of Low Earth Orbit Sats," Summers & Lepkowski.

Survival Low–Cost Communications System, E. Hirshfield 14 Feb. 1989.

Emerging Small Geostationary Communications Satellite, 29th International Meeting on Space, 8 Dec. 1989.

"Emerging Small Geostationary Communications Satellite . . . , " J. R. Stuart and K. R. Susskind, Ball Space Systems Division.

New Small Geosynchronous Communications Satellite . . . , Stuart, Schwegler, and Purchase, 14 Feb. 1991.

"Economic and Technical Considerations of a GSO Global MSS," Hrycenko, Johannsen, Louie and Lucas, 12–15 Jan. 1992.

System Design and Capabilities of a Current Technology . . . Satellite, Ball Aerospace Systems Division, 2 Oct. '87.

"Capabilities of a Current Technology . . . Satellite Design," J. R. Stuart, AIAA/DARPA LightSat Mtg. Paper, AIAA 87–3028.

"System Design and Capabilities of a Current Technology . . . " Stuart and Taylor, Paper SS–21, 7–9 Oct. 1987.

"QuickStar—Rapid Access to Space . . . ," T. P. Garrison and S. R. Schrock, 42nd IAF Congress, IAA–9–1–729, 5–11 Oct. 1991.

"TECHSTARS: Small, Smart Space Systems," Ball Space Systems Division, Boulder, Colo.

"MSAT–X: Medium Gain, Electronically Steered, Conformal . . . Antenna," NASA/JPL, JPL 400–276 (Insert A), Nov. 1985.

"MSAT–X: Medium–Gain, Mechanically Steered, Titled–Array Vehicle Antenna," NASA/JPL, JPL 400–276 (Insert B), Nov. 85.

"MSAT–X: Vehicle Antenna Pointing Techniques for Mobile Satellite Applications," NASA/JPL, JPL 400–276 (C), Nov. 85.

"MSAT–X: Low–Cost Omnidirectional Vehicle Antennas . . . , " NASA/JPL, JPL 400–276 (Insert D), Nov. 1985.

"MSAT–X: Near–Toll–Quality Digital Speech at 4800 bps," NASA/JPL, JPL 400–276 (Insert E), Nov. 1985.

"MSAT–X: Coded Modulation for 4800–9600 bps Transmission . . . " NAS/JPL, JPL 400–276 (Insert F), Nov. 1985.

"MSAT–X: Mobile Satellite Network Architecture and Efficient Multiple–Access Protocol," NASA/JPL, JPL 400–276 (H), Nov. 1985.

"MSAT–X: Propagation Experiments To Model the Mobile Satellite Channel," NASA/JPL, JPL 400–276 (Ins. I), Nov. 85.

"MSAT–X: Mobile Satellite Channel Simulation," NASA/JPL, JPL 400–276 (Insert J), Nov. 1985.

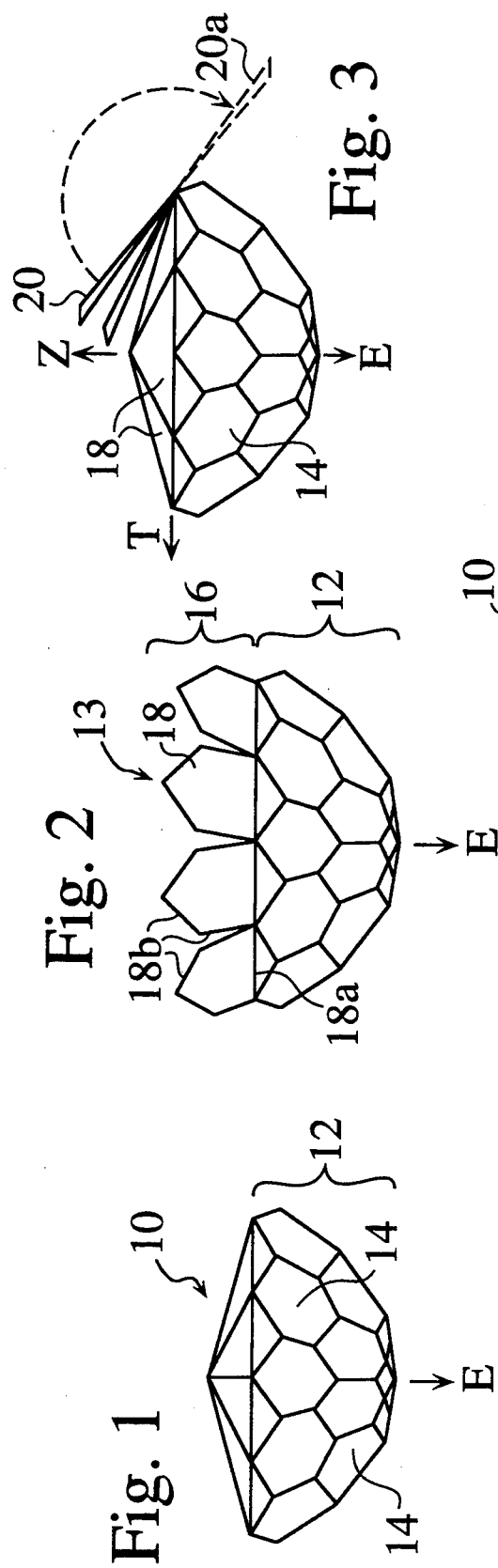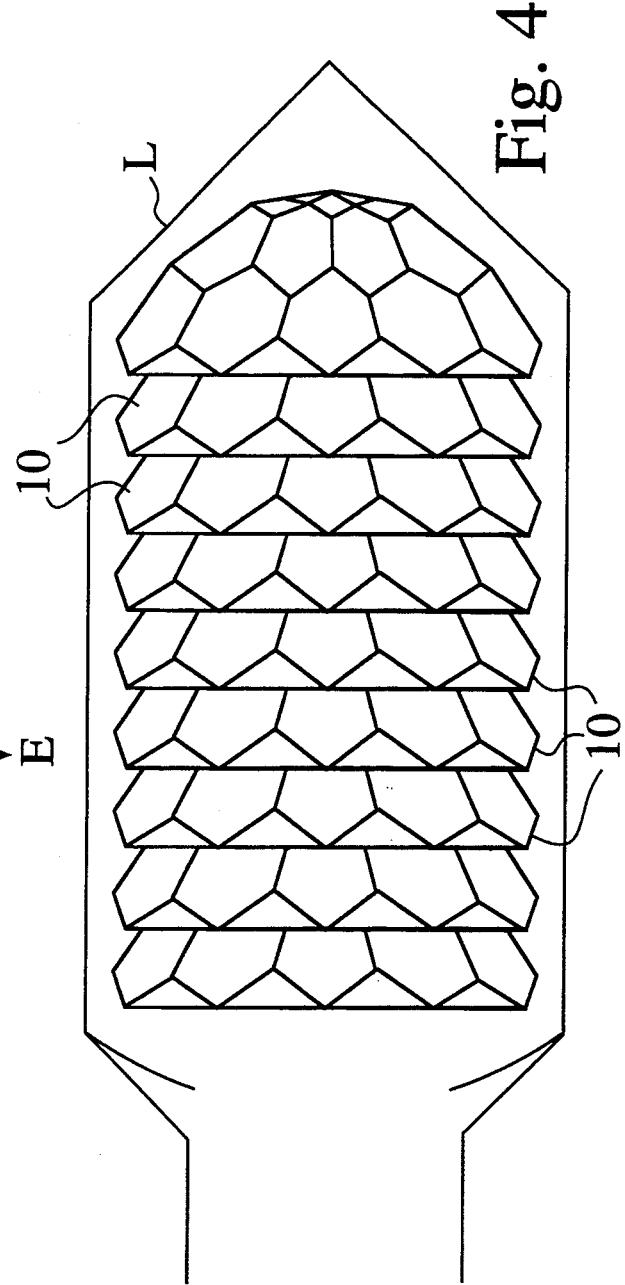

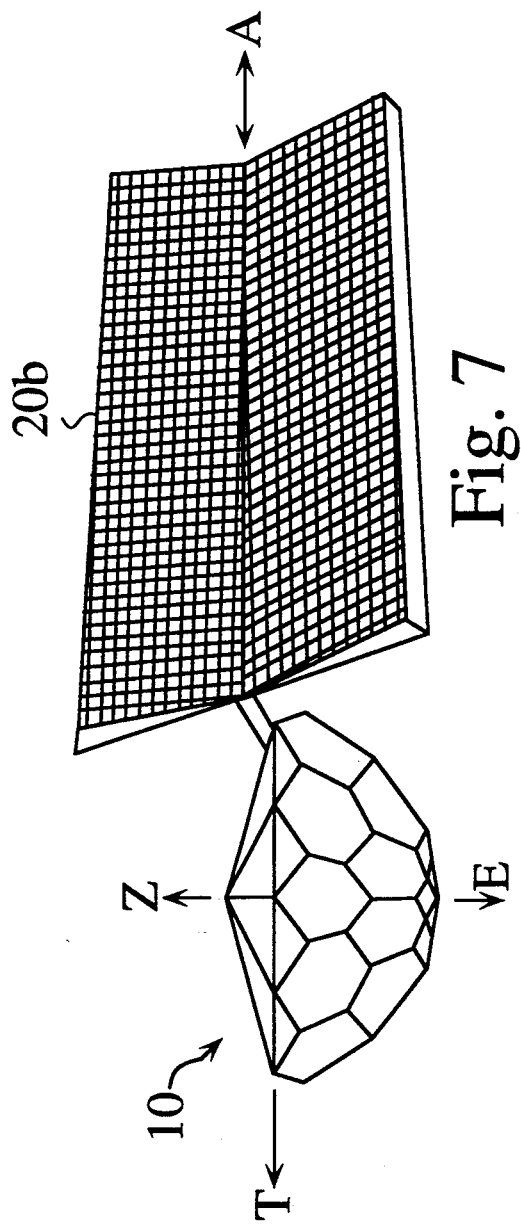
Fig. 6
Fig. 7
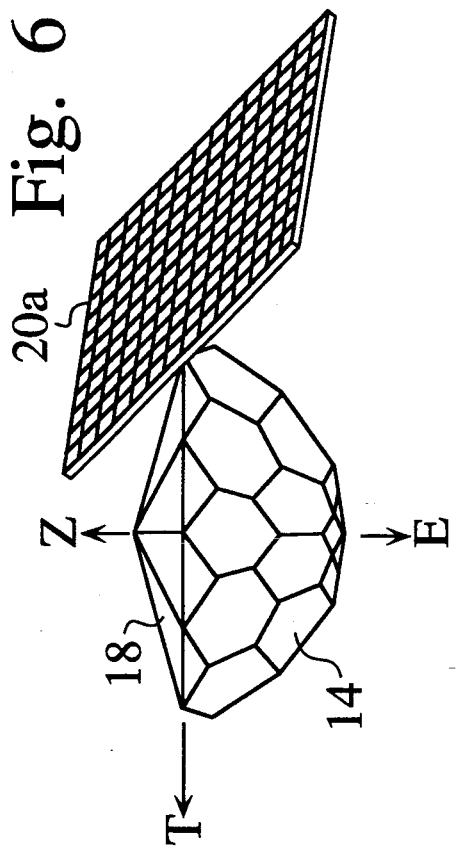
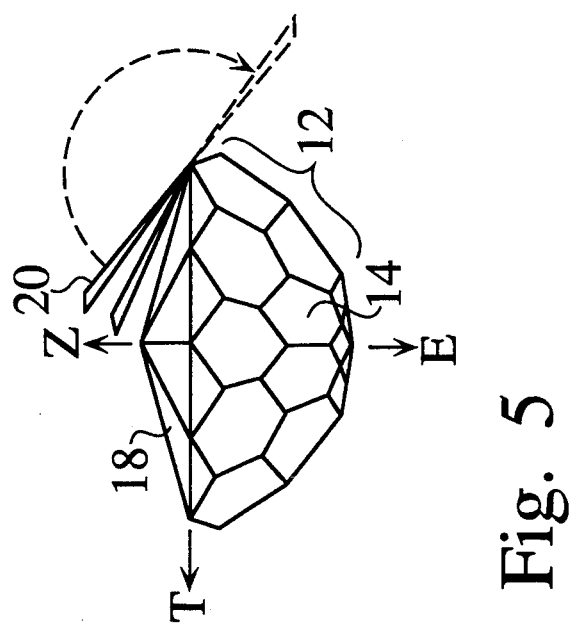
Fig. 5

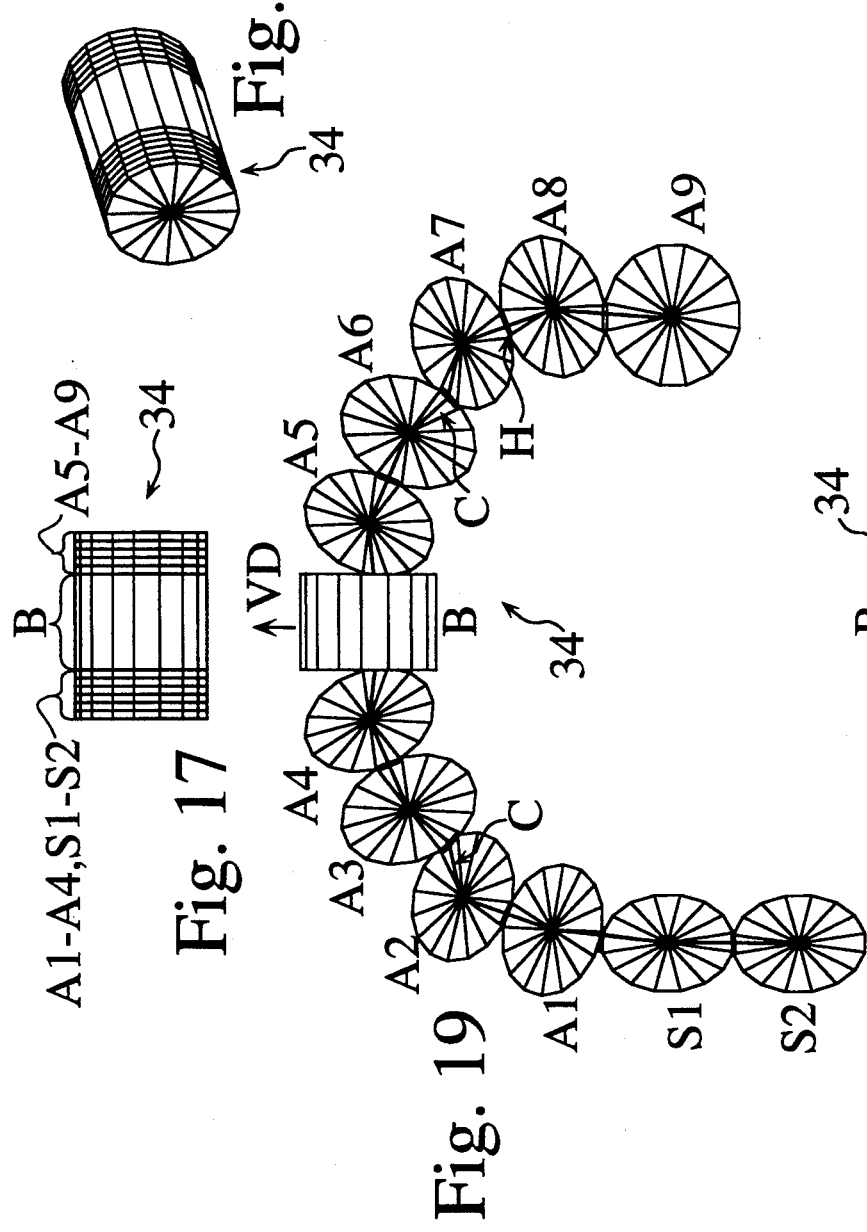

SPACECRAFT DESIGNS FOR SATELLITE COMMUNICATION SYSTEM

CLAIM FOR PRIORITY

The present application is a Continuation in Part application. The Applicant and Inventor hereby claim the benefit of priority under Section 120 of Title 35 of the United States Code of Laws for any and all subject matter which is commonly disclosed in the present application and in pending patent application U.S. Ser. No. 07/790,748 entitled *Spacecraft Designs for Satellite Communication System* by James R. Stuart, filed on Nov. 8, 1991, now abandoned. The Applicant and Inventor hereby also claims the benefit of priority under Section 120 of Title 35 of the United States Code of Laws for any and all subject matter which is commonly disclosed in the present application and in pending patent application U.S. Ser. No. 07/783,754 entitled *Satellite Communication System* by Edward F. Tuck et al., filed on Oct. 28, 1991.

CROSS-REFERENCES TO RELATED PATENT APPLICATIONS

The present patent application is related to the following commonly-owned and commonly-assigned pending patent applications filed on Oct. 28, 1991, Nov. 8, 1991, Jun. 6, 1992, Jul. 16, 1992, Oct. 28, 1992, Dec. 2, 1992, Feb. 9, 1993, Jun. 11, 1993, and Jul. 8, 1993.

*Satellite Communication System* by Edward Fenton Tuck et al., assigned U.S. Ser. No. 07/783,754;

*Method of Conducting a Telecommunications Business Implemented on a Computer* by Edward Fenton Tuck, assigned U.S. Ser. No. 07/895,295;

*Terrestrial Antennas for Satellite Communication System* by Asu Ram Jha, assigned U.S. Ser. No. 07/790,273, now abandoned, and *Terrestrial Antennas for Satellite Communication System* by Asu Ram Jha, assigned U.S. Ser. No. 07/984,609;

*Switching Methods for Satellite Communication System* by David Palmer Patterson and Moshe Lerner Liron, assigned U.S. Ser. No. 07/790,805;

*Beam Compensation Methods for Satellite Communication System* by David Palmer Patterson and Mark Alan Sturza, assigned U.S. Ser. No. 07/790,318, now abandoned, and *Earth-Fixed Cell Beam Management for Satellite Communication System* by David P. Patterson and Mark A. Sturza, assigned U.S. Ser. No. 08/088,714.

*Spacecraft Antennas & Beam Steering Methods for Satellite Communication System* by Douglas Gene Lockie, assigned U.S. Ser. No. 07/790,271, now abandoned, and *Spacecraft Antennas & Beam Steering Methods for Satellite Communication System* by Douglas Gene Lockie, assigned U.S. Ser. No. 07/967,988,

*Spacecraft Intersatellite Link for Satellite Communication System* by Douglas Gene Lockie et al, assigned U.S. Ser. No. 07/915,172;

*Spacecraft Designs for Satellite Communication System* by James R. Stuart, assigned U.S. Ser. No. 07/790,748; abandoned and

*Traffic Routing for Satellite Communication System* by Moshe Lerner Liron, assigned U.S. Ser. No. 08/016,204; *Modular Satellite for Satellite Communication System* by James R. Stuart, assigned U.S. Ser. No. 08/075,425.

FIELD OF THE INVENTION

The present invention relates to the field of satellite designs. More particularly, this invention is part of a constellation of 840 extremely high power and ultra-lightweight spacecraft grouped in sets of 40 equally spaced satellites which circle the globe in 21 separate low Earth orbits. The satellites operate in 700 km (435 mile) circular, sun-synchronous orbits which are inclined approximately 98.2 degrees to the equator.

BACKGROUND OF THE INVENTION

Communications satellites operating in Earth orbit were first seriously proposed during the middle of this century. A relatively small portion of current telephone traffic is relayed between ground stations by spacecraft carrying transponders that are located over a fixed position on the Earth in 22,300 mile geosynchronous orbits. Over the past few decades, public phone systems have relied primarily on land lines and microwave repeaters to handle call traffic. Cellular networks now provide service which extends previous network capabilities. Customers using hand-held portable phones or carphones are now able to access the conventional, centralized land-based system without using a traditional fixed phone, as long as their transportable terminals are within the range of land-based antenna towers called "cell sites." Even in the United States, these cell sites are not universally prevalent, since market forces restrict cellular service to only the most densely populated urban portions of our country. Since cellular service is available to only a small minority of privileged users in wealthy countries, and is virtually non-existent in lesser developed parts of the world, the operators of traditional phone networks are confronted with serious systemic problems that severely constrain the continued growth of their communications utilities.

No system that is currently available to the general public is capable of taking advantage of the enormous augmentation of communications capacity that could be achieved if the traditional centralized grid of terrestrial switches, wires, fibers, and microwave repeaters could be completely bypassed. Public phone companies are not presently able to sell continuous global service to their customers who wish to use phones that are not hard-wired to the land-based network. Some commercial spacecraft now in service help to relay some portion of the total call traffic, but all these calls must still pass through the conventional land-based system. The problem of providing an economically feasible network for voice, data, and video which can be used by subscribers all over the world has presented a major challenge to the communications business. The development of a constellation of reliable, high-gain satellites which can communicate directly to terrestrial terminals without routing calls through land-based networks would constitute a major technological advance and would satisfy a long felt need within the electronics and telephone industries.

SUMMARY OF THE INVENTION

The present invention is a vital part of a constellation of satellites which will revolutionize telecommunications by providing direct links among users across the world without using conventional land-based networks. One of the preferred embodiments of the invention called "Domesat" includes a hemispherical, high-gain, antenna array that is always pointed toward the Earth.

This electronically steered array is formed from a number of hexagonal antenna panels which are fabricated from ultra-lightweight honeycomb materials and advanced composites. The panels are held together by tubular and spherical connectors. The interior of the dome-shaped antenna array is used to store solar cell panels made from amorphous silicon which unfurl through an opening in a space-facing array when the spacecraft reaches its final orbit. Each panel is coupled to its own Gallium-arsenide (GaAs) millimeter wave integrated circuits (MMIC) which maintain the satellite's internal control systems and coordinate communications with other satellites and ground terminals. The hemispherical contour of the antenna array allows several satellites to be nested in a compact arrangement that fits within the payload bay of a launch vehicle.

One of the alternative embodiments of the invention, "Gearsat", includes an inflatable torus. When viewed from the side along its circumference, the torus looks like two flattened pyramids that share a common base. Phased array antenna panels are deployed across the top of the pyramid, while arrays of amorphous silicon solar cells cover the slanted surfaces. The satellite rotates about its center, and individual portions of the antenna panels are specifically dedicated to transmit and receive signals from pre-defined regions on the ground. Another alternative embodiment, which is generally referred to as "Batsat", comprises a central cylindrical body and a plurality of substantially circular, foldable, linked panels which carry antennas and solar/thermal arrays.

The present invention is a vital element of a novel *Satellite Communication System,* by Edward F. Tuck et al. which is described in a copending U.S. patent application Ser. No. 07/783,754. An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

FIG. 1 is a side view of the Earth-facing antenna array and space-facing segments of the present invention. This preferred embodiment is referred to below as "Domesat".

FIG. 2 reveals the space-facing segments in an opened configuration, which allows for the deployment of solar panels that are stored within the spacecraft interior during the flight to low Earth orbit.

FIG. 3 shows the circular movement of the rolled-up solar panels as they are deployed after orbit has been achieved.

FIG. 4 portrays a number of satellites produced in accordance with the present invention stored in a launch vehicle.

FIGS. 5, 6, and 7 depict the sequential deployment of the solar panels.

FIG. 8 supplies a detailed side view of the tubular and spherical elements which are employed to connect the individual panels of the antenna array.

FIGS. 9, 10, and 11 illustrate three views of an alternative embodiment of the invention called "Gearsat."

FIGS. 12, 13, 14, and 15 are schematic diagrams of on-board internal systems that control the satellite and that handle traffic among other satellites and terminals on the ground.

FIGS. 16, 17, 18, 19 and 20 depict an alternative embodiment of the invention which is generally referred to as "Batsat". FIGS. 16 and 17 show the satellite in its stowed configuration, while FIG. 18 portrays several units stacked together in preparation for launch. FIGS. 19 and 20 supply schematic top and rear views of the Batsat embodiment after deployment.

A DETAILED DESCRIPTION OF PREFERRED EMBODIMENTS

Domesat

Figure 8:
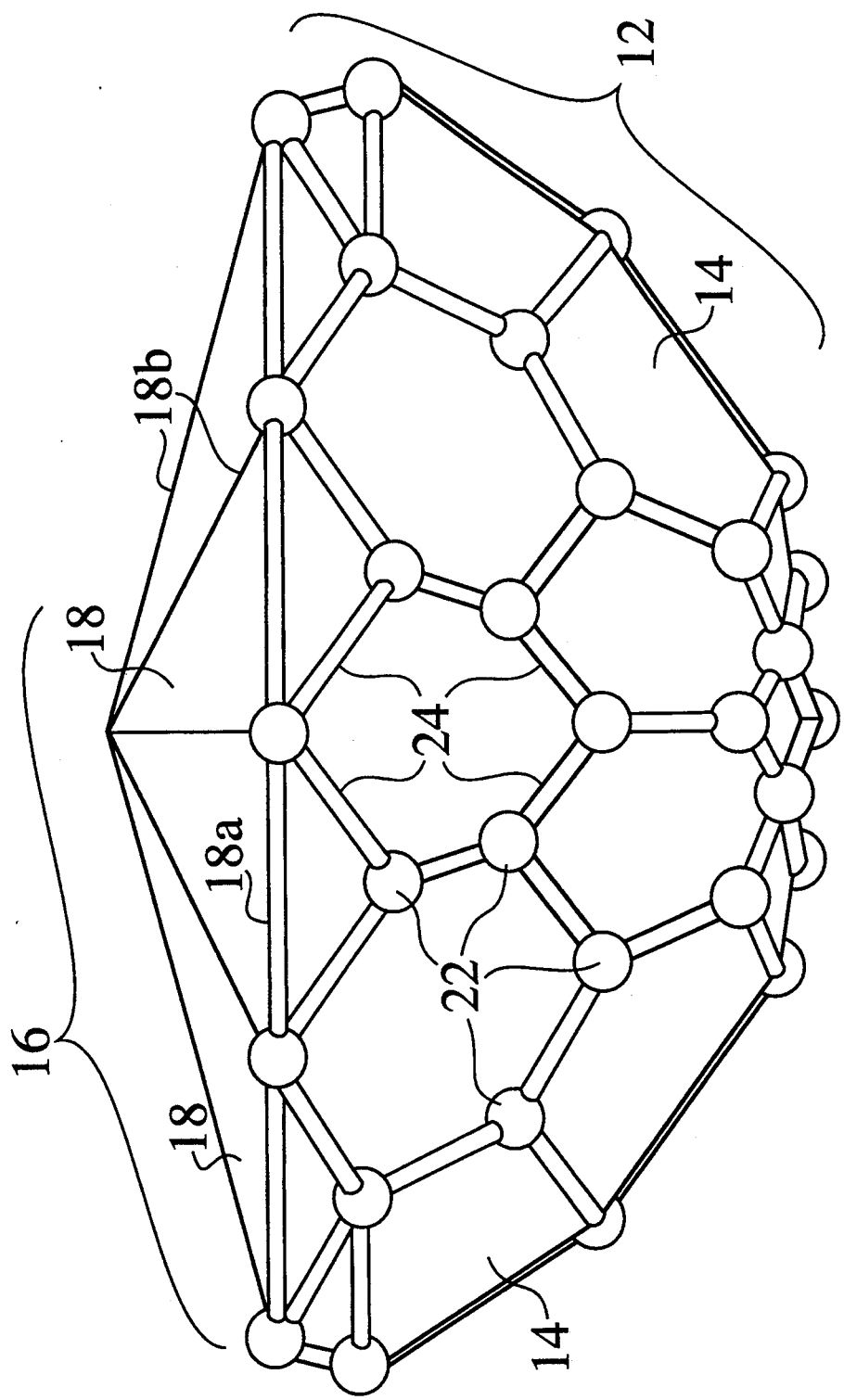

FIGS. 1, 2, and 3 depict side views of the Earth-facing antenna array and space-facing segments of the present invention called "Domesat". A satellite 10 having a partially hollow interior 11 includes a concave, geodesic antenna array 12 which is always pointed in the direction of the Earth E. The array 12 is formed from individual panels 14 which are each coupled to active beam-steering circuitry that handles and manages call traffic. A space-facing array 16 includes individual polygonal sections 18 that look away from the Earth E. As viewed by a terminal on the ground, the space-facing array is always oriented in the direction of the local zenith Z. Each segment 18 has one fixed edge 18a connected to the antenna array 12 by a hinge. All the other edges 18b of each segment are free to move, so that the "top" of the spacecraft can be opened once it attains orbit. When the segments 18 of the space-facing array 16 are moved apart, rolled-up solar panels 20a are swung out from the interior 11 and are unfurled to their fully extended positions 20b in a direction opposite the direction of travel T of the spacecraft. The sun-facing surfaces of the rectangular solar panels 20 are covered with amorphous, thin-film silicon, and can be "canted" or rotated about their longitudinal axis A to gather the maximum amount of light from the sun.

FIG. 4 portrays several satellites 10 stored coaxially in a compact, nested arrangement within the payload bay of a launch vehicle L. Before the satellite 10 is opened and the solar panels 20 are unfurled, the spacecraft resembles a cup which measures about four meters across. In the preferred embodiment, the satellites can be stacked inside launchers which are 4.4 meters wide.

FIGS. 5, 6, and 7 reveal a sequence of views showing the deployment of the solar panels 20. In the preferred embodiment of the invention, panels 20 are coupled to nickel metal-hydride batteries that can store over 300 AH of energy. This configuration of solar panels 20 and batteries work together to provide over 3 KW of continuously-available power. As an alternative, the Domesat embodiment could use solar panels deployed around its circumference or trailing streamers covered with solar cells instead of the panels 20.

FIG. 8 exhibits spherical and tubular connectors 22 and 24 which hold the antenna panels 14 together. The antenna panels 14 are each coupled to their own receivers, transmitters, beam steering and call switching electronics. These on-board circuit components are located within the interior 11 at the edges of the panels 14 and are held in place by the spherical and tubular connectors 22 and 24.

Gearsat

Figure 9:
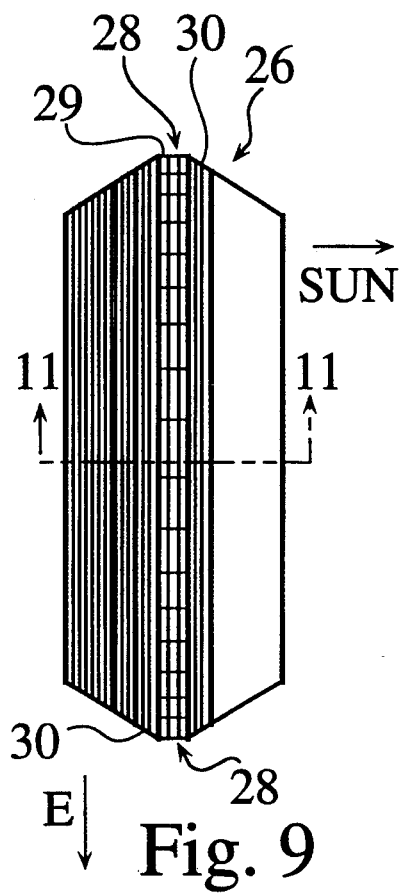
Figure 10:
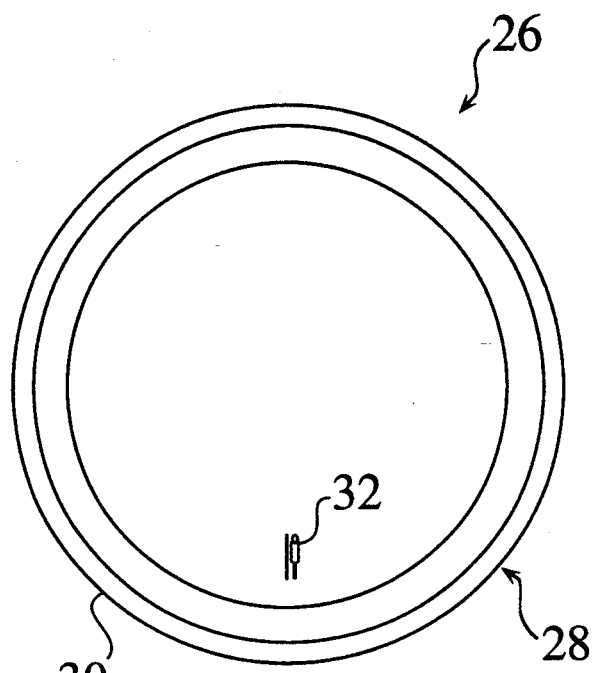
Figure 11:
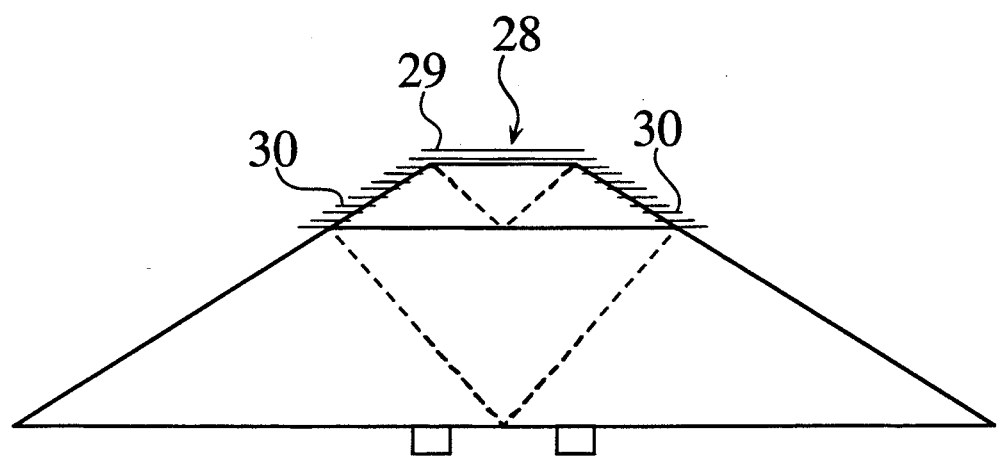
Figure 12:
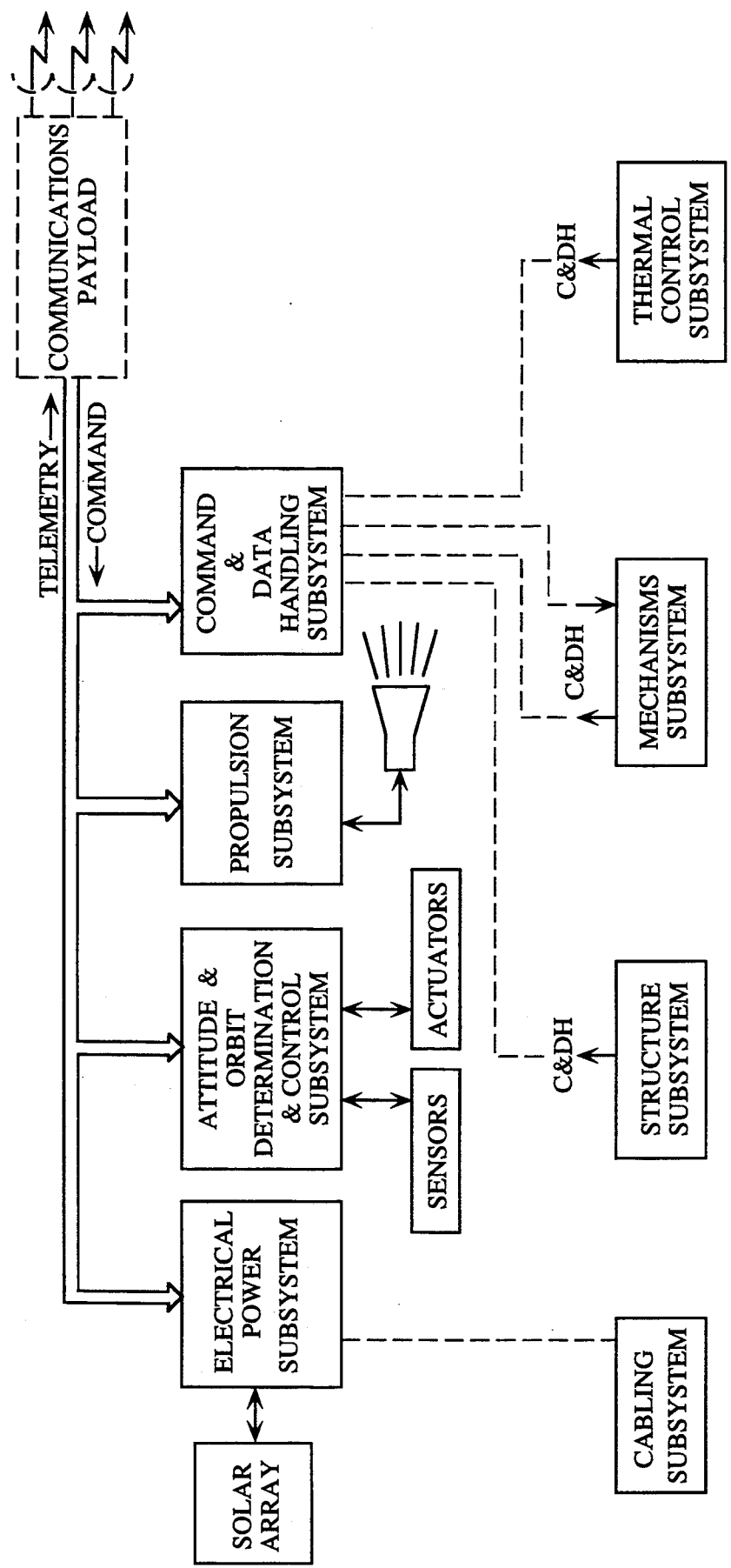
Figure 13:
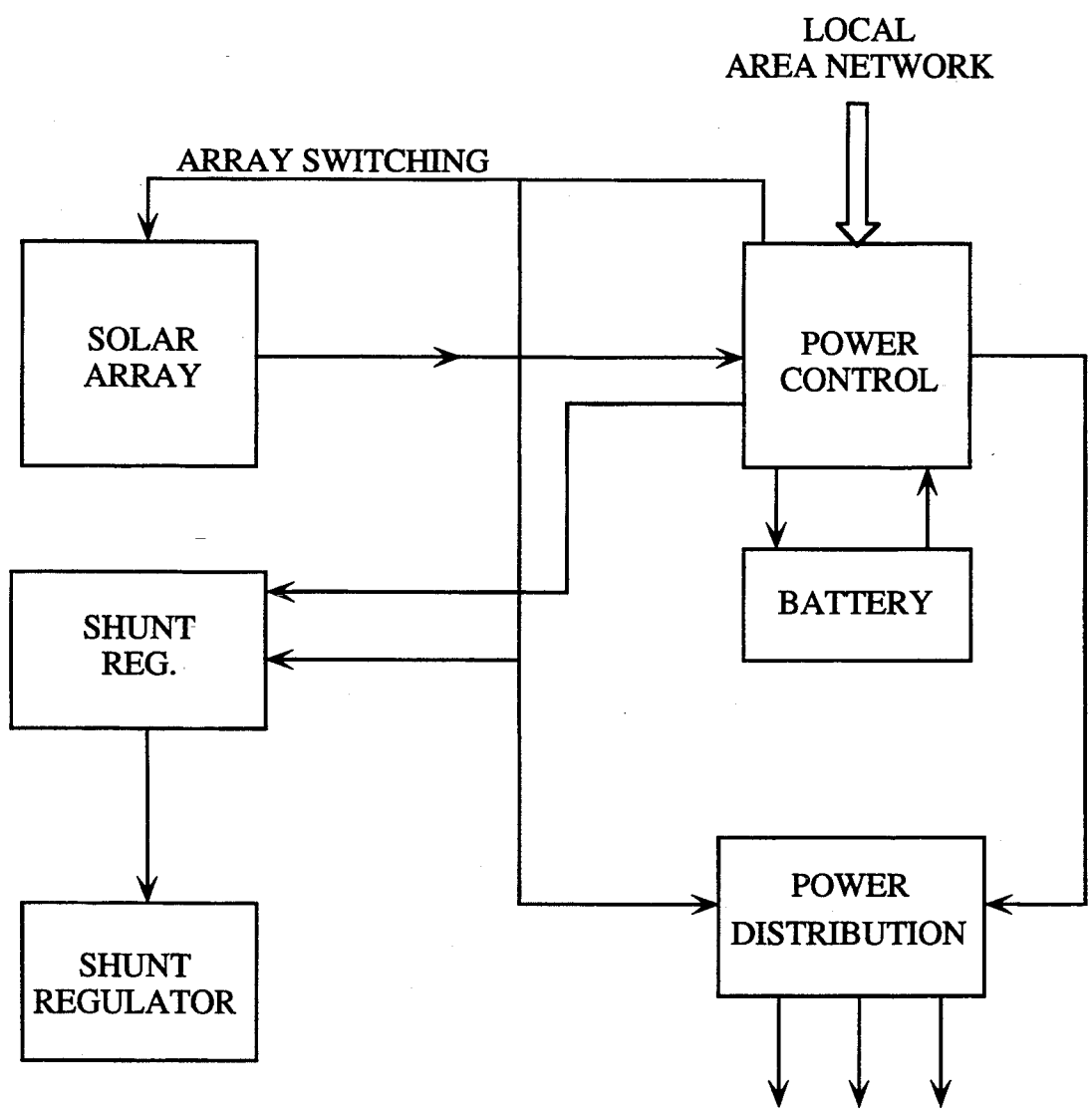
Figure 14:
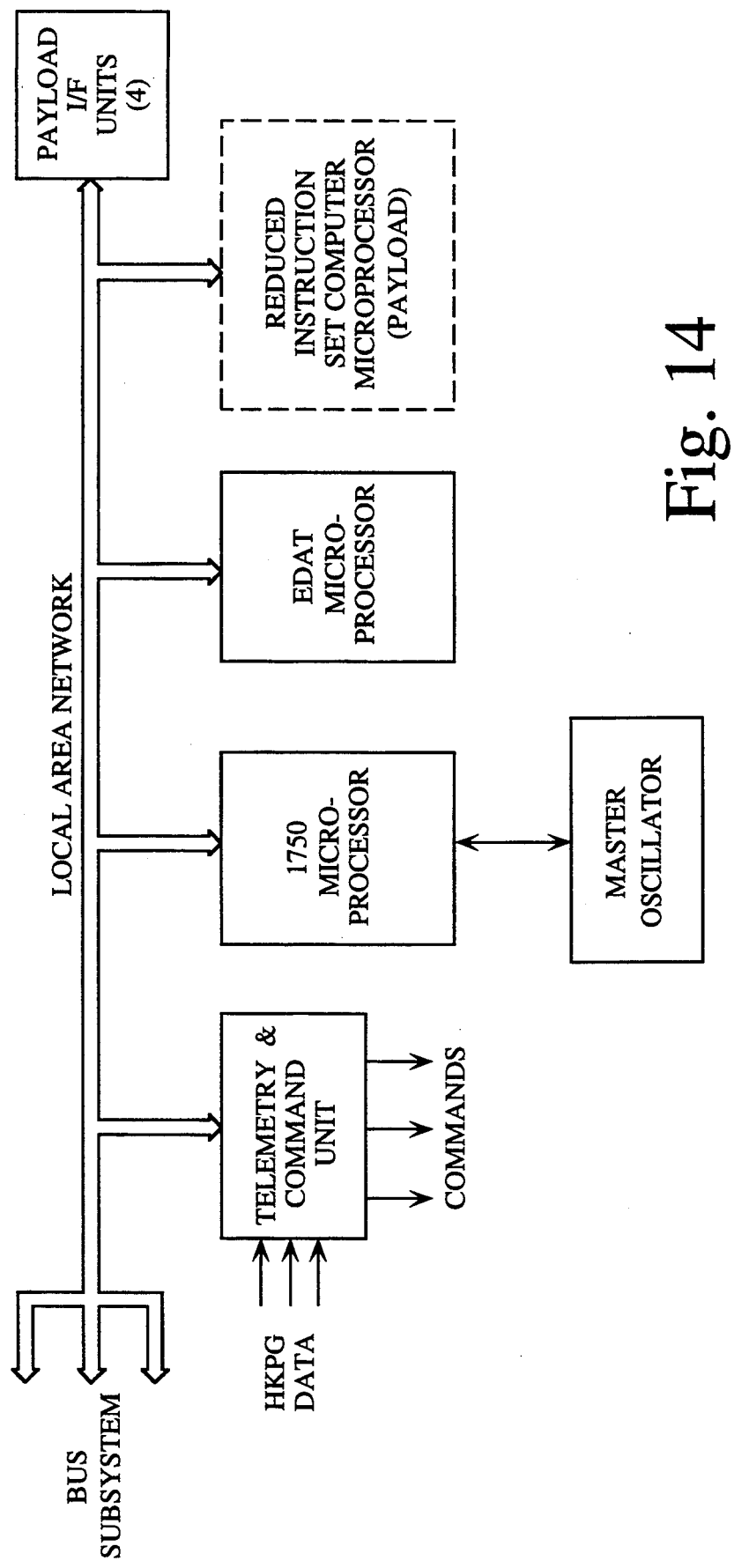
Figure 15:
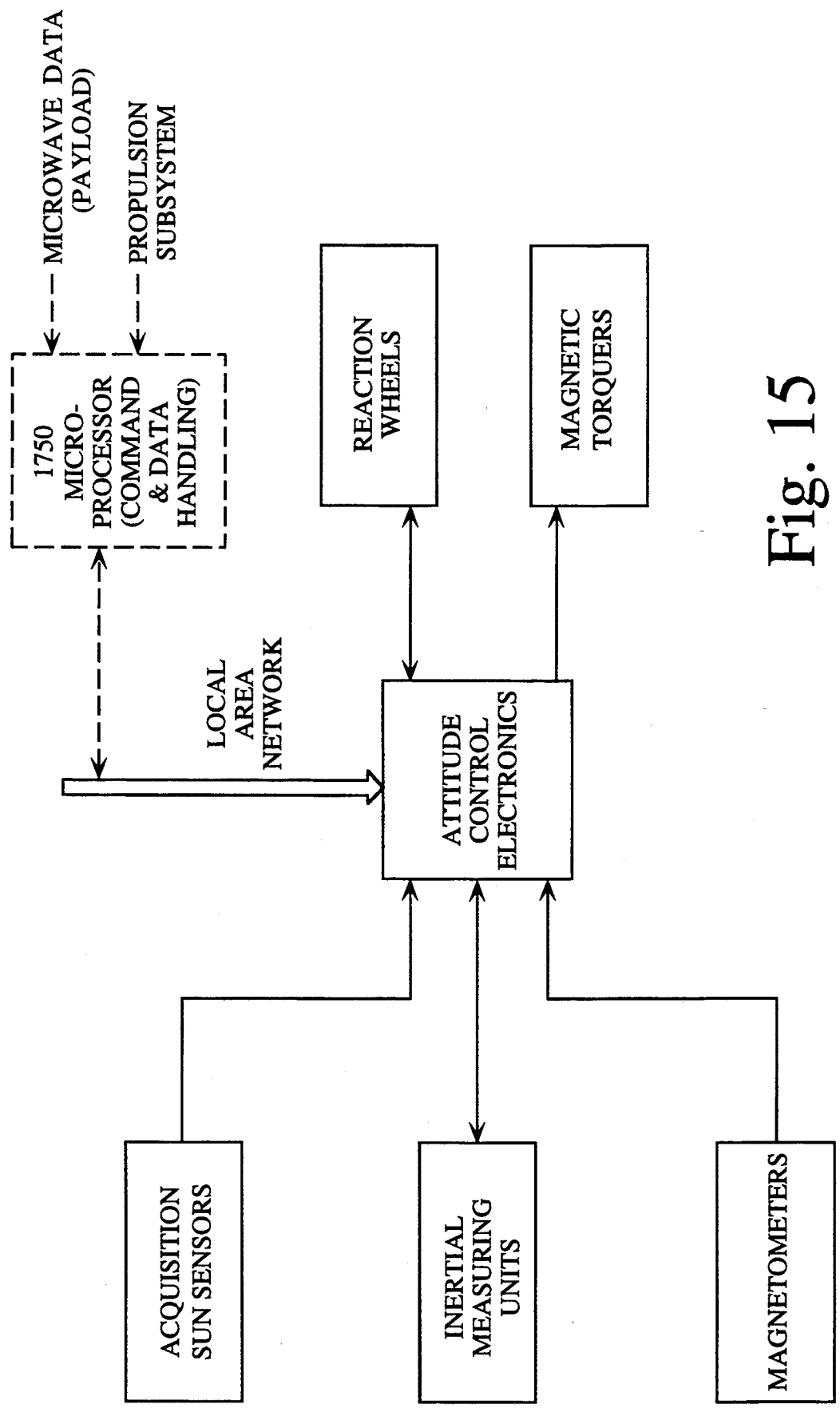

FIGS. 9, 10, and 11 illustrate three views of an alternative embodiment of the invention called "Gearsat". One embodiment of Gearsat 26 is shown schematically in a side view in FIG. 9, and comprises an inflatable torus having a radius of approximately ten (10) meters. The scale of the torus 26 is suggested in a different side view by FIG. 10, which includes a schematic representation of a person 32 standing two meters tall. Once deployed in orbit, Gearsat 26 revolves about its center at a rate of roughly 0.1 revolutions per minute, turning slowly like a rolling pin whose longest dimension extends perpendicular to its direction of travel. The axis of rotation of the satellite 26 is always normal to its orbital pathway. An outermost surface 28 that generally defines a cylinder lies at the periphery of the satellite 26. This cylindrical surface 28 bears an array of antennas 29 which transmit and receive radio signals to and from other satellites in the constellation and to and from personal, mobile and fixed terminals and gateways. The antenna array 29 includes sixty (60) adjacent rectangular panels, each measuring approximately one meter square. As best seen in the partial side view presented in FIG. 11, two rows of solar cells 30 lie adjacent to the antennas 29. The sixty antenna panels comprise an active, electronically steered phase array. The reader is invited to peruse the construction specifications of these antennas by referring to a copending U.S. patent application Ser. No. 07/915,172 entitled *Spacecraft Antennas & Beam Steering Methods for Satellite Communication System* by Douglas Gene Lockie et al.

At any given time, three of the sixty antenna panels 29 are pointed toward the Earth's surface and are transmitting and receiving signals. As the satellite 26 revolves, antenna panels 29 become active as they move into position facing the Earth E, and also terminate their activity as they turn away from the Earth. This continuous hand-off of the communication operation from one set of antenna panels 29 to another is controlled by earth sensors, and insures that radio beams from the satellite 26 are always illuminating the surface below them. The area of the ground in the path of these beams is called the "footprint" of the satellite 26. The Gearsat embodiment derives its name from the spatial synchronization of the antenna panels 29 with specific regions of the ground that are illuminated by the beams generated by the antennas 29. Like the engaged teeth of two mechanical gears, particular antenna panels 29 in the array are matched with particular regions on the ground. Radio beams emanating from the sixty panels 29 are essentially "locked" or dedicated to specific footprints or cells below it on the Earth's surface. While the text above specifies one particular satellite configuration that offers this form of spatial synchronization among antennas 29 and beam footprints, the reader will appreciate that the central objective of providing a dedicated relationship among many antennas and footprints may be carried out using a wide variety of various implementations without departing from the spirit and scope of the invention claimed below.

FIGS. 12, 13, 14, and 15 are schematic diagrams of on-board internal systems that control the satellite and that handle traffic among other satellites and terminals on the ground. The systems illustrated in FIGS. 12, 13, 14 and 15 may be generally incorporated in any of the embodiments of Domesat, Gearsat or Batsat.

In one of the preferred embodiments of the invention, the satellites shown in the figures operate in a constellation of 840 spacecraft which includes 21 sets of 40 equally-spaced satellites flying in 21 orbits. The entire fleet travels around the Earth in sun-synchronous orbits 700 km (435 miles) above the Earth. The circular orbits are inclined 98.2 degrees to the equator. There are 21 orbit planes at different fixed longitude-of-ascending-nodes. Each plane is separated approximately 8.6 degrees (8 degrees and 34.3 minutes) from its neighbors. Every plane is occupied by 40 equally spaced satellites. All ascending nodes are grouped together between 6 AM and 6 PM. Satellites in adjacent orbits travel in the same direction except at the "seams between" north-going and south-going portions of the orbits. The satellite system is 3-axis stabilized and momentum biased. Magnetic torquers, reaction wheels and passive aerodynamic pressure provide the required autonomous control torques that keep the antenna panels 12 pointed toward the Earth E and the satellite 10, 26, 34 pointed toward the direction of travel T as shown in FIGS. 6 and 7.

The subsystems of each spacecraft 10, 26, 34 are identified below:

An Electrical Power Subsystem (EPS) derives energy from the photovoltaic cells covering panels 20, and power is stored in nickel metal-hydride batteries.

An Attitude and Orbit Determination and Control Subsystem (AODC) maintains the orientation of the spacecraft using three axis stabilization methods. Sun sensors are used as an initial reference once the satellite achieves orbit. Afterwards, inertial measuring units, magnetometers, and information gathered from call traffic is used to keep the craft on course and steady in its desired position. Each satellite "knows" its own position and the positions of all the other satellites in the constellation, as well as all the positions of terminals on the ground.

A Propulsion Subsystem uses redundant pulse-plasma thrusters which accomplish maneuvers that include orbit insertion, drag make-up, stationkeeping and deorbit at the end of the satellites lifetime.

A Command and Data Handling Subsystem (C&DH) acquires, conditions and formats all satellite data and decodes, stores and distributes all satellite commands. The C&DH comprises a processor with a 4Gb solid-state RAM memory that is coupled to a local area network (LAN). A microprocessor analyzes, interprets and compresses on-board data, and another microprocessor, running at 20 million instructions per second (MIPS), is dedicated to processing traffic.

A Structure Subsystem comprises the geodesic, concave, stackable support skeleton which bears the antenna array 12.

A Mechanisms Subsystem includes components that deploy and orient the solar panels 20.

A Thermal Control Subsystem includes blankets and coats of paint that manage the thermal conditions of the satellite.

A Cabling Subsystem contains all the conductors that unite the power and signal electronics on the ship.

Batsat

Figure 22:
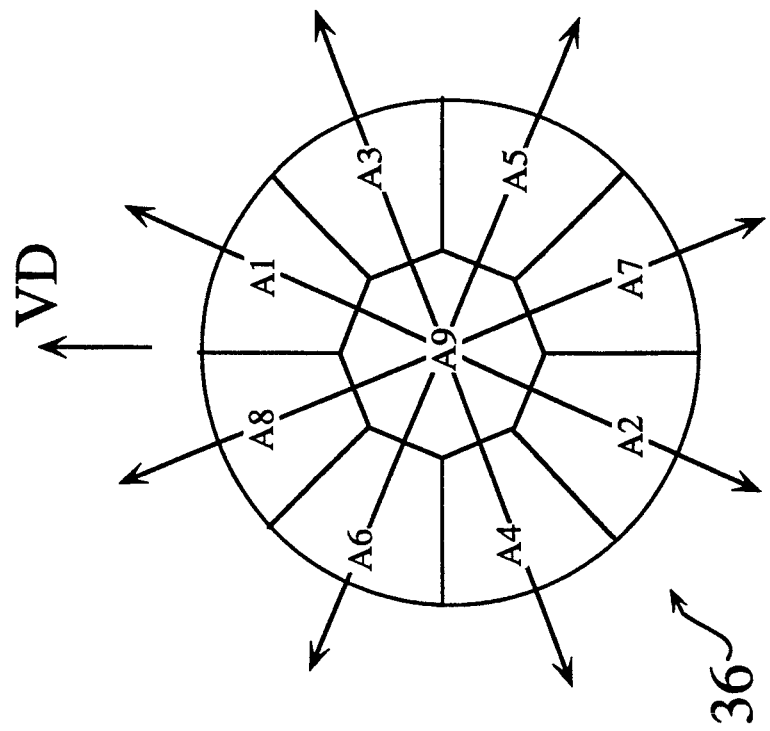
FIGS. 21 and 22 illustrate the satellite footprints generated by Batsat.
Figure 21:
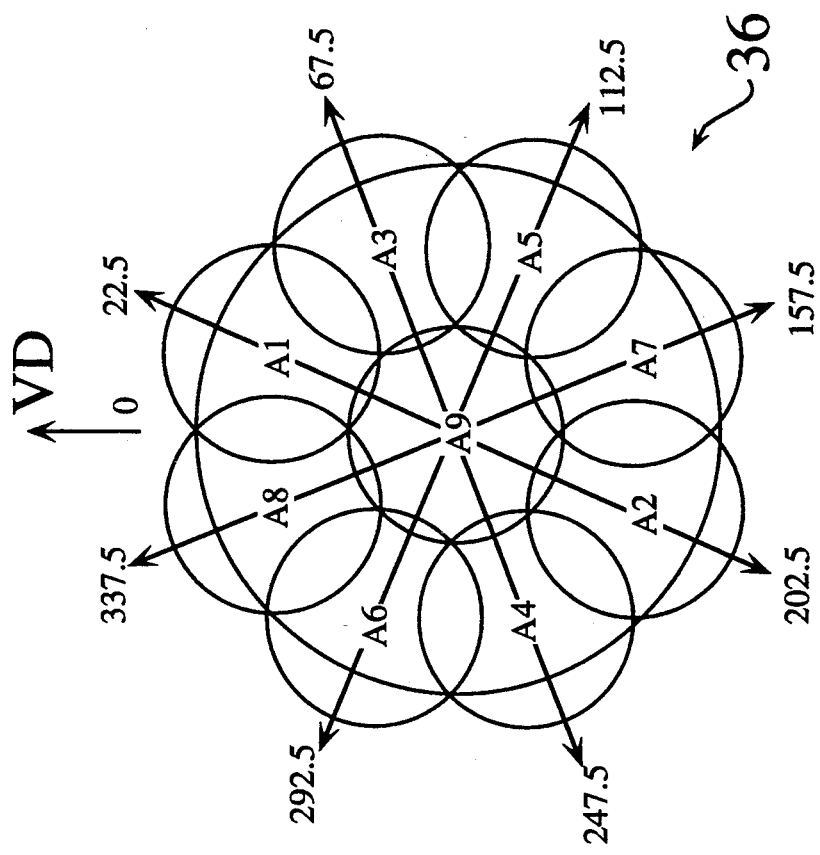
Figure 23:
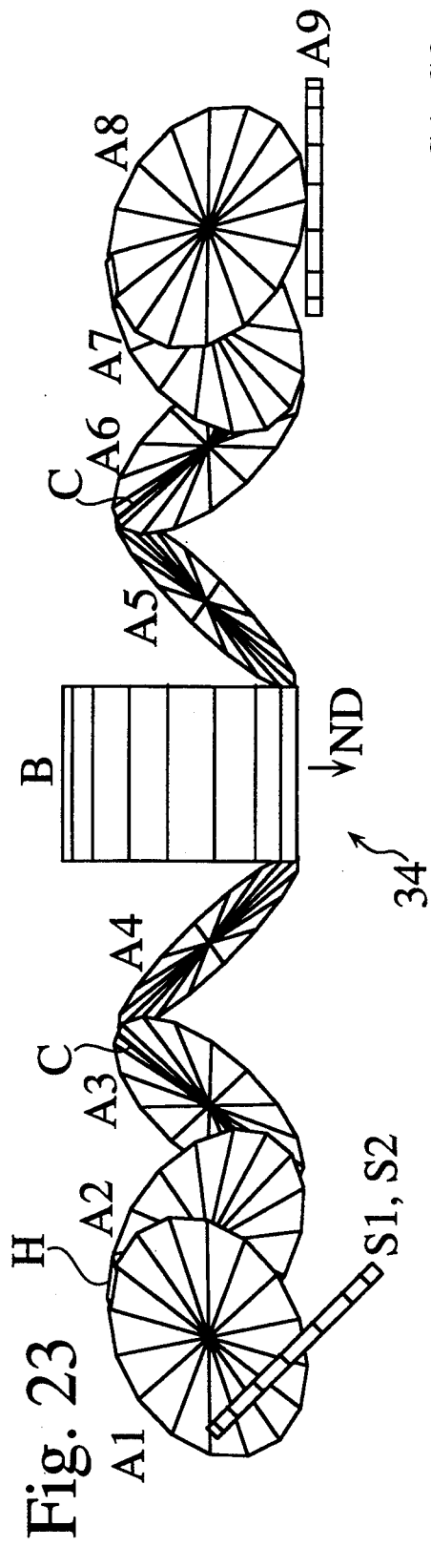
FIG. 23 is an enlarged view of the illustration of Batsat supplied by FIG. 20.
Figure 25:
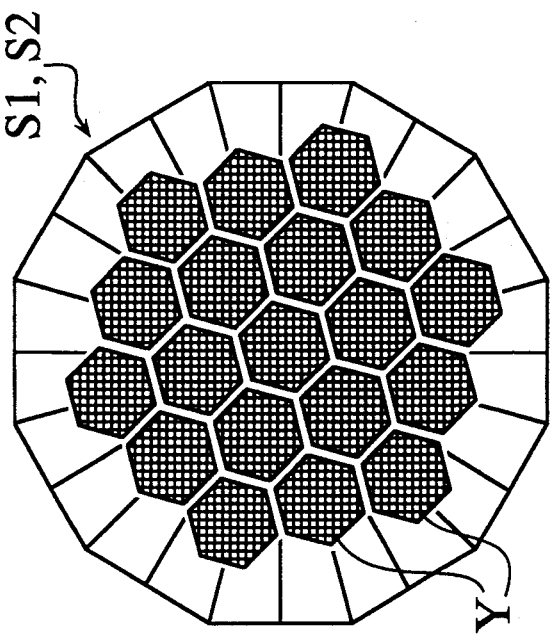
FIGS. 24 and 25 are schematic depictions of the hexagonal antennas, solar cells and thermal radiators borne by the circular panels shown in FIGS. 19 and 20.
Figure 24:
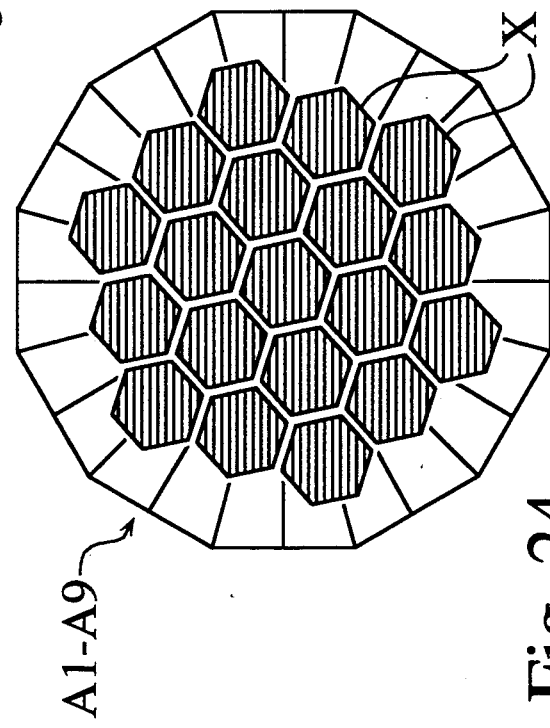

FIGS. 16, 17, 18, 19 and 20 depict another alternative embodiment of the invention which is generally referred to as "Batsat" 34. FIGS. 16 and 17 show the satellite in its folded and stowed configuration, while FIG. 18 portrays several folded units stacked together in preparation for launch. FIGS. 19 and 20 supply schematic top and rear views of the Batsat embodiment after it has reached orbit and has been completely unfolded and locked into its operational configuration. FIGS. 21 and 22 illustrate the satellite footprints 36 generated by radio beams emitted by Batsat. FIG. 21 illustrates the footprint coverage capability for each panel, while FIG. 22 illustrates the primary coverage areas without overlap. FIG. 23 is an enlarged view which supplies details of the satellite 34 shown in FIG. 20. FIGS. 24 and 25 reveal antenna surfaces X and solar/thermal surfaces Y which reside on antenna panels A1 through A9 and solar/thermal panels S1 and S2, respectively.

The preferred embodiment of Batsat 34 includes a central cylindrical body B and two arms that extend away from the central body B in generally opposite directions. The arms comprise nine substantially circular, disc-shaped antenna panels A1 through A9, and a pair of solar/thermal panels S1 and S2. The central body B has a generally cylindrical shape, and includes two flat faces which receive antenna panels A4 and A5 when the satellite 34 is in its folded and stowed configuration. When deployed after reaching orbit, the two flat faces of the body B are positioned perpendicular to the direction of the Nadir. As best seen in FIG. 23, four antenna panels A1, A2, A3 and A4 are connected in series to and extend from one side of central body B, while the other five antenna panels A5, A6, A7, A8 and A9 are similarly connected in series and extend in the opposite direction. The two solar/thermal panels S1 and S2 are connected in series to antenna panel A1. Each antenna or solar/thermal panel is coupled to its neighbor or neighbors with power, control and communication cables C and spring-loaded self-latching hinges H. Each panel has two generally circular flat faces. The face of each antenna panel A1-A9 which is oriented toward the Earth's surface carries a set of hexagonal antenna surfaces X. The faces of the two solar/thermal panels S1 and S2 carry both hexagonal areas of solar cells and thermal radiators Y. When Batsat is fully deployed, all the connected antenna panels A1-A9 and solar/thermal panels S1 and S2 are spaced as far apart as the hinges H and cables C allow. In this configuration, the spacecraft resembles a bat with its wings fully extended in two opposing arcs, and the elements of the satellite 34 reside at their "maximum possible unfolded distances" from central body B. When the Batsat panels are folded together like an accordion, the elements of the ship reside at their "minimum possible folded distances" from central body B.

Batsat incorporates high-gain, electronically-steered, phased-array antennas X to provide telecommunication links over a contiguous surface area within view of the satellite 34. The problem faced by nearly all satellite systems concerns the limited amount of frequency spectrum available for communication links between a satellite communication system and communication terminals on the Earth. Previous systems employ various multiple access schemes which divide the footprint generated by the satellite's illumination into multiple spots or cells. These cells are organized into patterns which allow the same frequencies to be reused many times within a particular footprint. When the frequencies are physically separated, the reuse technique is called "space division", and is represented by the acronym "SDMA", or space division multiple access. When the codes are different, the method is called "code division" and the abbreviation "CDMA" is used as a shorthand expression for "code division multiple access". The acronym "TDMA" stands for "time division multiple access", and indicates that many beams having the same frequency are emitted at different times. Each of these techniques help to eliminate interference between cells using the same frequencies. As a general rule, the smaller the cell, the more the set of frequencies can be reused within the footprint. The reuse of frequencies leads to spectral efficiency and the potential for higher capacity for the satellite and network as a whole.

To achieve full footprint coverage, the number of cells in a satellite footprint is selected to be inversely proportional to the area of the cell. Assuming each satellite antenna A1-A9 produces one transmit or receive beam which is multiplexed over a fixed number of cells, the number of antennas on the satellite then also increases as the cell size decreases. The cell size is primarily a function of the directivity, or antenna gain, of the satellite antenna—the smaller the cell size, the higher the required gain.

For a given frequency, the gain of an antenna is proportional to its effective area of the antenna in the direction of the source (destination) of the received (transmitted) signal. The effective area of a flat surface phased array antenna is greatest along the zenith, which is colinear with the line perpendicular to the surface of the antenna. The effective area, and thus the gain, decreases in proportion to the cosine of the angle between the zenith and a line to the communication source/destination. For the best antenna performance, the required beam steering angle needs to be kept small so that the antenna's effective area is close to its actual area. For this reason, Batsat is designed to achieve high spectral efficiency and system capacity. The present invention includes a large number of high-gain antennas and a corresponding large amount of antenna surface area. The antenna surfaces are arranged to keep the beam steering requirements to a few degrees.

Batsat not only offers high spectral efficiency and system capacity, but does so at a minimal launch cost. Because the present invention can be folded, stacked and packed into a relatively small launch vehicle (L), the cost of placing each satellite into orbit is relatively low.

Each antenna panel A1-A9 is responsible for one portion of the satellite footprint. In its fully deployed configuration, the antenna panels A1-A9 are arranged at angles with respect to the Earth which limit the beam steering angle of each antenna beam to a few degrees, yet allow full coverage of the footprint area by the plurality of antennas. Two panels S1 and S2 at the end of each arm provide solar arrays on the side facing the sun and thermal radiators on the opposite side. These panels are deployed at an angle which is the optimal angle for both solar energy collection and thermal radiating for the sun-synchronous orbit in which the satellite operates. The hinges H are spring loaded latching hinges. Once released from their restraints, the panels A1-A9, S1 and S2 deploy automatically. The springs push the panels apart, and the locking mechanism locks them into the correct deployment angle. The hinges on each panel which join that panel to the previous panel or satellite body B and to the next panel are offset from each other. The combination of offset angle and the hinge locking angle determines the deployment angle of each panel. For example, if the offset angle is 180 degrees and the locking angle is 90 degrees, the deployed wings would extend straight along the axis of the central body in a series of perpendicular panels. By changing the offset angle of the hinges, the panels can be deployed in an arc extending from each end of the central body such that each panel points at a different angle (azimuth and elevation) with respect to the earth. The flexible cables C may include optical fibers or copper wires, and connect the panels with each other and to the central body for passing control, data, power, etc.

Since the preferred embodiment of the invention is deployed in a sun-synchronous orbit, there is an optimum deployment angle for solar arrays and thermal radiators. For example, in the terminator orbit (6 AM–6 PM), a vertically oriented array will always have one face to the sun and one to cold space. A panel with solar collection on one side and thermal radiators on the other can be deployed at one angle which is the optimal angle for both functions for the life of the satellite. In this design, the solar/thermal panels are the last panel(s) on the arms and are designed to be rotated about an axis parallel to the velocity vector of the satellite and latched to the correct angle. The solar array is stowed as a panel of the same diameter as the other panels for packing efficiency, but may include deployment mechanisms if the surface area required exceeds that of one or two panels.

Although the preferred embodiment has been described as comprising the central body, nine antenna panels and two solar/thermal panels, additional small panels may used for intersatellite links. The antenna panels comprise multiple antenna facets, each capable of generating a single transmit or receive beam. Each beam can be steered ±15° from its zenith in all directions. Table One supplies the antenna deployment angles with respect to the satellite nadir. One panel points in the nadir direction, while the other eight antenna panels point in directions which are displaced 30° in elevation from the nadir and evenly spaced at 45° increments in azimuth.

TABLE ONE

| Reference | Element | Elevation | Azimuth |
|---|---|---|---|
| B | Satellite Body | NA | NA |
| A1 | Antenna Panel 1 | 45 | 22.5 |
| A2 | Antenna Panel 2 | 45 | 202.5 |
| A3 | Antenna Panel 3 | 45 | 67.5 |
| A4 | Antenna Panel 4 | 45 | 247.5 |
| A5 | Antenna Panel 5 | 45 | 112.5 |
| A6 | Antenna Panel 6 | 45 | 292.5 |
| A7 | Antenna Panel 7 | 45 | 157.5 |
| A8 | Antenna Panel 8 | 45 | 337.5 |
| A9 | Antenna Panel 9 (Nadir) | 0 | NA |
| S1 | Solar/Thermal Panel 1 | 45 | 90 |
| S2 | Solar/Thermal Panel 2 | 45 | 90 |
| C | Power, Control, and Communication Cables | NA | NA |
| H | Spring Loaded, Self-Latching Hinges | NA | NA |

The values presented below the column labeled "Elevation" are angles measured in degrees with respect to the direction of the Nadir. The values presented below the column labeled "Azimuth" are angles measured in degrees with respect to the direction of the Velocity Vector, as shown in FIG. 19.

Each of the embodiments of the invention, Domesat, Gearsat and Batsat may incorporate teflon thrusters for precise altitude, attitude and position control. These thrusters use small pieces of a material such as teflon as fuel. Extremely small amounts of the teflon are expelled from miniature nozzles, and the slight reactions of the spacecraft provide highly precise position control.

More detailed information about the constellation may be found in a related, copending application entitled *Satellite Communication System* by Edward F. Tuck et al. The design and operation of the antennas are more fully disclosed in a related, copending application entitled *Spacecraft Antennas & Beam Steering Methods for Satellite Communication System* by Douglas G. Lockie, which is also noted above.

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIGS. 1, 2, 3 & 4
  10 Satellite
  11 Satellite interior enclosed by antenna array
  12 Antenna array
  14 Individual hexagonal panel within antenna array
  16 Space-facing array
  18 Individual segment within space-facing array
  18a Fixed, hinged edge
  18b Movable edge
  20 Solar panel
  E Direction of Earth
  Launch vehicle storage compartment holding nested satellites
  Z Direction of zenith
FIGS. 5, 6 & 7
  20a Solar panels in partially unfurled position
  20b Solar panels in fully unfurled position
  A Longitudinal axis of solar panels
  E Direction of Earth
  T Direction of travel of orbiting satellite
  Z Direction of zenith
FIG. 8
  22 Spherical connectors
  24 Tubular connectors
FIGS. 9, 10 & 11
  26 Gearsat
  28 Cylindrical surface
  29 Rectangular antenna panels on cylindrical surface
  30 Solar panels
  32 Schematic representation of a person two meters tall
FIGS. 12, 13, 14 & 15
  Schematic diagrams of internal satellite systems
FIGS. 16, 17, 18, 19, 20, 21, 22, 23, 24 & 25
  34 Batsat
  36 Footprints
  B Central Body
  A1 Antenna Panel 1
  A2 Antenna Panel 2

A3 Antenna Panel 3
A4 Antenna Panel 4
A5 Antenna Panel 5
A6 Antenna Panel 6
A7 Antenna Panel 7
A8 Antenna Panel 8
A9 Antenna Panel 9 (Nadir)
S1 Solar/Thermal Panel 1
S2 Solar/Thermal Panel 2
C Power, Control & Communication Cables
H Spring Loaded, Self-Latching Hinges
X Antenna surfaces
Y Solar/thermal surfaces

What is claimed is:

1. A spacecraft apparatus capable of being placed in a low Earth orbit using a launch vehicle (L) and also being capable of operating as one of a constellation of communications satellites in a low Earth orbit for providing communications among said constellation of communications satellites and among a plurality of portable, mobile, and fixed terminals comprising:

an antenna array (12);
   said antenna array (12) including a plurality of substantially hexagonal, planar antenna panels (14) and having an interior (11) which is substantially enclosed by said plurality of substantially hexagonal, planar antenna panels (14);
   said plurality of substantially hexagonal, planar antenna panels (14) being maintained in an orbital orientation which aims said plurality of substantially hexagonal, planar antenna panels (14) generally toward the Earth's surface;
   a plurality of spherical connector elements (22) and tubular connector elements (24); said plurality of spherical and tubular connector elements (22 & 24) being used to mechanically couple
   said plurality of substantially hexagonal, planar antenna panels (14) in a generally contiguous pattern which approximates the contour of a partially oblate hemisphere; and
   said antenna array (12) being capable of being stowed in a coaxially nested arrangement with other antenna arrays (12) for transportation in said launch vehicle (L);
a space-facing array (16);
   said space-facing array (16) including a plurality of substantially polygonal, planar segments (18);
   each of said plurality of substantially polygonal, planar segments (18)
   being maintained in an orbital orientation which aims said plurality of substantially polygonal, planar segments (18) generally away from the Earth's surface;
   having a hinged boundary (18a); said hinged boundary (18a) residing generally adjacent to said antenna array (12); and
   further having a plurality of movable boundaries (18b); each of said plurality of movable boundaries being capable of moving in a circular path toward said antenna array (12) to provide access to said interior (11) of said antenna array (12);
said space-facing array (16) also partially enclosing said interior (11) of said antenna array (12); and
a solar panel (20) for supplying power to said antenna array (12);
   said solar panel (20) being capable of being stowed substantially within said interior (11) of said antenna array (12);
   said solar panel (20) being capable of being deployed outside said antenna array (12) and unfurled to a fully extended position (20b) after said space-facing array (16) is opened by moving said plurality of substantially polygonal, planar segments (18);
   said solar panel (20) including a layer of amorphous silicon solar cells;
   said solar panel (20) being mechanically connected to said antenna array (12); and
   said solar panel (20) being capable of being rotated about its longitudinal axis (A) to optimize the collection of solar radiation.

2. A spacecraft apparatus capable of being placed in a low Earth orbit using a launch vehicle (L) and also being capable of operating as one of a constellation of communications satellites in a low Earth orbit for providing communications among said constellation of communications satellites and among a plurality of portable, mobile, and fixed terminals comprising:

an antenna array (12);
   said antenna array (12) including a plurality of substantially planar antenna panels (14) and having an interior (11) which is substantially enclosed by said plurality of substantially planar antenna panels (14);
   said plurality of substantially planar antenna panels (14) being maintained in an orbital orientation which aims said plurality of substantially planar antenna panels (14) generally toward the Earth's surface;
   a plurality of connector elements (22 & 24); said plurality of connector elements (22 & 24) being used to mechanically couple said plurality of substantially planar antenna panels (14) in a generally contiguous pattern which approximates the contour of a partially oblate hemisphere; and
   said antenna array (12) being capable of being stowed in a coaxially nested arrangement with other antenna arrays (12) for transportation in said launch vehicle (L);
a space-facing array (16);
   said space-facing array (16) including a plurality of substantially polygonal, planar segments (18);
   each of said plurality of substantially polygonal, planar segments (18)
   being maintained in an orbital orientation which aims said plurality of substantially polygonal, planar segments (18) generally away from the Earth's surface;
   having a hinged boundary (18a); said hinged boundary (18a) residing generally adjacent to said antenna array (12); and
   further having a plurality of movable boundaries (18b); each of said plurality of movable boundaries (18b) being capable of moving in a circular path toward said antenna array (12) to provide access to said interior (11) of said antenna array (12);
said space-facing array (16) also partially enclosing said interior (11) of said antenna array (12); and
a solar panel (20) for supplying power to said antenna array (12);
   said solar panel (20) being capable of being stowed substantially within said interior (11) of said antenna array (12);
   said solar panel (20) being capable of being deployed outside said antenna array (12) and unfurled to a fully extended position (20b) after said space-facing array (16) is opened by moving said plurality of substantially polygonal, planar segments (18);

said solar panel (20) being mechanically connected to said antenna array (12); and said solar panel (20) being capable of being rotated about its longitudinal axis (A) to optimize the collection of solar radiation.

3. A spacecraft apparatus capable of being placed in a low Earth orbit using a launch vehicle (L) and also being capable of operating as one of a constellation of communications satellites in a low Earth orbit for providing communications among said constellation of communications satellites and among a plurality of portable, mobile, and fixed terminals comprising:

a means for deploying and operating an Earth-facing antenna array (12) in low Earth orbit;

said means for deploying and operating an Earth-facing antenna array (12) including a plurality of substantially planar antenna panels (14) and having an interior (11) which is substantially enclosed by said plurality of substantially planar antenna panels (14);

said plurality of substantially planar antenna panels (14) being maintained in an orbital orientation which aims said plurality of substantially planar antenna panels (14) generally toward the Earth's surface;

a plurality of connector elements (22 & 24); said plurality of connector elements (22 & 24) being used to mechanically couple said plurality of substantially planar antenna panels (14) in a generally contiguous pattern which approximates the contour of a hemisphere; and said means for deploying and operating an Earth-facing antenna array (12) being capable of being stowed in a coaxially nested arrangement with other of said means for deploying and operating antenna arrays (12) for transportation in said launch vehicle (L);

a means for deploying a space-facing array (16);

said means for deploying a space-facing array (16) including a plurality of substantially polygonal, planar segments (18);

each of said plurality of substantially polygonal, planar segments (18) being maintained in an orbital orientation which aims said plurality of substantially polygonal, planar segments (18) generally away from the Earth's surface;

said means for deploying a space-facing array (16) being mechanically coupled to said means for deploying and operating antenna arrays (12) and also partially enclosing said interior of said means for deploying and operating antenna arrays (12); and a means for supplying power (20) to said means for deploying and operating an Earth-facing antenna array (12);

said means for supplying power (20) being capable of being stowed substantially within said interior (11) of said means for deploying and operating an Earth-facing antenna array (12);

said means for supplying power (20) being capable of being deployed outside said means for deploying and operating an Earth-facing antenna array (12) and unfurled to a fully extended position (20b) after said means for deploying a space-facing array (16) is opened by moving said plurality of substantially polygonal, planar segments (18); and said means for supplying power (20) being mechanically connected to said means for deploying and operating an Earth-facing antenna array (12).

4. A method of providing communications among a plurality of portable, mobile, and fixed terminals by operating a spacecraft constellation in a low Earth orbit comprising the steps of:

launching said spacecraft constellation into said low Earth orbit; said spacecraft constellation including a plurality of satellites (10); each of said plurality of satellites (10) including an Earth-facing array of antennas (12);

a space-facing array (16) of panels (18); said space-facing array (16) being mechanically coupled to said Earth-facing array of antennas (12);

a solar panel assembly (20); said solar panel assembly (20) being coupled within both of said Earth-facing array of antennas (12) and said space-facing array (16) of panels (18); and an autonomous microprocessor for handling said communications among said plurality of portable, mobile and fixed terminals and an attitude and orbit determination and control subsystem for determining each of said plurality of satellites' (10) own position and the position of its neighboring satellites in said spacecraft constellation;

boosting said plurality of satellites (10) into an operational low Earth orbit of at least 500 kilometers in altitude;

deploying said plurality of satellites (10) from a launch vehicle (L) containing a number of nested satellites (10);

orienting each of said plurality of satellites (10) so that said Earth-facing array of antennas (12) is aligned substantially towards the Earth;

opening said space-facing array (16) by moving said panels (18);

rotating said solar panel assembly (20) beyond both of said Earth-facing array of antennas (12) and said space-facing array (16) of panels (18); and unfurling said solar panel assembly (20) into an operative condition to gather solar radiation.

* * * * *

UNITED STATES PATENT AND TRADEMARK OFFICE
CERTIFICATE OF CORRECTION

PATENT NO. : 5,386,953

DATED : February 7, 1995

INVENTOR(S) : James R. Stuart

It is certified that error appears in the above-identified patent and that said Letters Patent is hereby corrected as shown below:

On the title page,

| | |
|---|---|
| item [57], line 10, | "interior of the" should be --interior (13) of the--. |
| item [57], Line 12, | "opening (11) in the" should be --opening in the-. |
| Column 1, line 7: | "claim" should be --claims--. |
| Column 1, line 58: | "et al" should be --et al.--. |
| Column 4, line 23: | "11" should be --13--. |
| Column 4, line 38: | "11" should be --13--. |
| Column 4, line 68: | "11" should be --13--. |
| Column 5, line 27: | "side view presented" should be --side view 11 presented--. |
| Column 6, line 16: | "seams between" should be --"seams" between--. |
| Column 7, line 6: | "configuration." should be --configuration, with velocity direction VD and orientation towards Nadir ND, as shown.--. |

UNITED STATES PATENT AND TRADEMARK OFFICE
CERTIFICATE OF CORRECTION

PATENT NO.    : 5,386,953

DATED         : February 7, 1995

INVENTOR(S)   : James R. Stuart

It is certified that error appears in the above-identified patent and that said Letters Patent is hereby corrected as shown below:

| | |
|---|---|
| Column 7, line 8: | "illustrates the" should be --illustrates the potential-. |
| Column 7, line 9: | "panel,while" should be --panel with a maximum beam steering angle of 15 degrees while--. |
| Column 7, line 10: | "areas without" should be --areas of actual antenna panels A1-A9 without--. |
| Column 7, line 30: | "AS" should be --A5--. |
| Column 9, line 36: | "nadir." should be --nadir ND.--. |
| Column 9, line 60: | "Nadir." should be --Nadir ND.--. |
| Column 9, line 63: | "tor,as" should be --tor VD as--. |
| Column 10, line 32: | Delete "11    Satellite interior enclosed by antenna array". |
| Column 10, line 32: | Insert --13    Satellite interior enclosed by antenna array--. |
| Column 10, line 39: | "panel" should be --panels--. |
| Column 10, line 55: | Insert --11    Partial side view of Gearsat--. |

UNITED STATES PATENT AND TRADEMARK OFFICE
CERTIFICATE OF CORRECTION

PATENT NO.   :   5,386,953                                    Page 3 of 4

DATED        :   February 7, 1995

INVENTOR(S)  :   James R. Stuart

It is certified that error appears in the above-identified patent and that said Letters Patent is hereby corrected as shown below:

Column 11, line 10:   Insert --ND    Nadir--.

Column 11, line 10:   Insert --VD    Velocity direction--.

Column 11, line 25:   "(11)" should be --(13)-.

Column 11, line 61:   "(11)" should be --(13)--.

Column 11, line 63:   "(11)" should be --(13)--.

Column 11, line 67:   "(11)" should be --(13)--.

Column 12, line 24:   "(11)" should be --(13)--.

Column 12, line 58:   "(11)" should be --(13)--.

Column 12, line 61:   "(11)" should be --(13)--.

UNITED STATES PATENT AND TRADEMARK OFFICE
CERTIFICATE OF CORRECTION

PATENT NO. : 5,386,953
DATED : February 7, 1995
INVENTOR(S) : James R. Stuart

It is certified that error appears in the above-indentified patent and that said Letters Patent is hereby corrected as shown below:

Column 12, line 65:  "(11)" should be --(13)--.

Column 13, line 23:  "(11)" should be --(13)--.

Column 14, line 6:   "(11)" should be --(13)--.

Signed and Sealed this

Seventh Day of October, 1997

Attest:

BRUCE LEHMAN

*Attesting Officer*    Commissioner of Patents and Trademarks